(12) United States Patent
Doshi et al.

(10) Patent No.: US 10,534,710 B2
(45) Date of Patent: Jan. 14, 2020

(54) NON-VOLATILE MEMORY AWARE CACHING POLICIES

(71) Applicant: Intel Corporation, Santa Clara, CA (US)

(72) Inventors: Kshitij Doshi, Tempe, AZ (US); Bhanu Shankar, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/015,880

(22) Filed: Jun. 22, 2018

(65) Prior Publication Data

US 2019/0042416 A1 Feb. 7, 2019

(51) Int. Cl.
*G06F 12/0897* (2016.01)
*G06F 12/0804* (2016.01)
*G06F 12/084* (2016.01)
*G06F 12/126* (2016.01)
*G06F 12/0868* (2016.01)
*G06F 12/0873* (2016.01)

(52) U.S. Cl.
CPC ........ *G06F 12/0804* (2013.01); *G06F 12/084* (2013.01); *G06F 12/126* (2013.01); *G06F 12/0868* (2013.01); *G06F 12/0873* (2013.01); *G06F 12/0897* (2013.01); *G06F 2212/1024* (2013.01); *G06F 2212/1044* (2013.01); *G06F 2212/205* (2013.01); *G06F 2212/217* (2013.01); *G06F 2212/2542* (2013.01); *G06F 2212/311* (2013.01); *G06F 2212/604* (2013.01); *G06F 2212/7202* (2013.01)

(58) Field of Classification Search
None
See application file for complete search history.

(56) References Cited

U.S. PATENT DOCUMENTS

| | | |
|---|---|---|
| 2005/0188158 A1 | 8/2005 | Schubert |
| 2016/0283388 A1 | 9/2016 | Blankenship et al. |
| 2017/0357446 A1* | 12/2017 | Moyer ................ G06F 12/0891 |
| 2018/0113815 A1 | 4/2018 | Eckert et al. |
| 2018/0191642 A1* | 7/2018 | Biederman ......... H04L 12/4641 |
| 2019/0026228 A1* | 1/2019 | Jiang .................... G06F 12/084 |

FOREIGN PATENT DOCUMENTS

KR 101602150 B1 3/2016

OTHER PUBLICATIONS

Extended European Search Report dated Nov. 11, 2019 for EP Application No. 19175271.6, 10 pages.

* cited by examiner

*Primary Examiner* — Brian R Peugh
(74) *Attorney, Agent, or Firm* — Schwabe, Williamson & Wyatt, P.C.

(57) ABSTRACT

In embodiments, an apparatus may include a CC, and a LLC coupled to the CC, the CC to reserve a defined portion of the LLC where data objects whose home location is in a NVM are given placement priority. In embodiments, the apparatus may be further coupled to at least one lower level cache and a second LLC, wherein the CC may further identify modified data objects in the at least one lower level cache whose home location is in a second NVM, and in response to the identification, cause the modified data objects to be written from the lower level cache to the second LLC, the second LLC located in a same socket as the second NVM.

20 Claims, 12 Drawing Sheets

NON-VOLATILE MEMORY AWARE CACHING POLICIES

FIELD

Embodiments of the present disclosure relate to control of cache components in computing devices with non-volatile memory (NVM), and in particular to caching policies that are NVM aware.

BACKGROUND

A cache is a computer component that transparently stores copies of certain memory locations such that future requests for data stored in those memory locations may be satisfied more efficiently. If the requested data is in the cache, the request may be handled by reading the cache, which is comparatively faster than reading the memory. Moreover, many modern processors may have multiple independent caches, including instruction as well as data caches, where the data cache is often organized as a hierarchy of multiple cache levels, such as, for example, L1, L2, and L3 (the lower the number, the closer the cache is to an associated processor). Generally, the highest numbered cache is often referred to as the "last level cache" (LLC). Thus, for example, in a processing system that has three levels of caches, the L3 cache may also be known as the last level cache (LLC).

Some computing devices use NVM as some or part of their system memory. In the event of a power failure, in some approaches, modified cache lines from the cache hierarchy may be flushed to their "home" NVM by an enhanced asynchronous DRAM refresh (EADR) process. Moreover, in multi-processor (e.g., multiple socket or multiple core in one socket) computing systems or devices, a cache line may be "remote" from its home NVM (e.g., the cache line is stored in a cache of a socket or core other than the socket or core where its home NVM is). For such cache lines, following a power failure, an example EADR process may, in a first stage, transfer both remote cache lines from the remote socket to their respective memory controller (MC), as well as transfer cache lines already in their home socket to the home MC. Then, in a second stage, the MC may write all NVM homed cache lines to the home NVM. For such an EADR process to complete, an example computing device needs to provide either a battery or capacitor based auxiliary power source so that both stages may complete, for all "dirty" cache lines (e.g., modified data objects stored in a cache that were not yet written to their home NVM) across the device.

DETAILED DESCRIPTION

Figure 1:
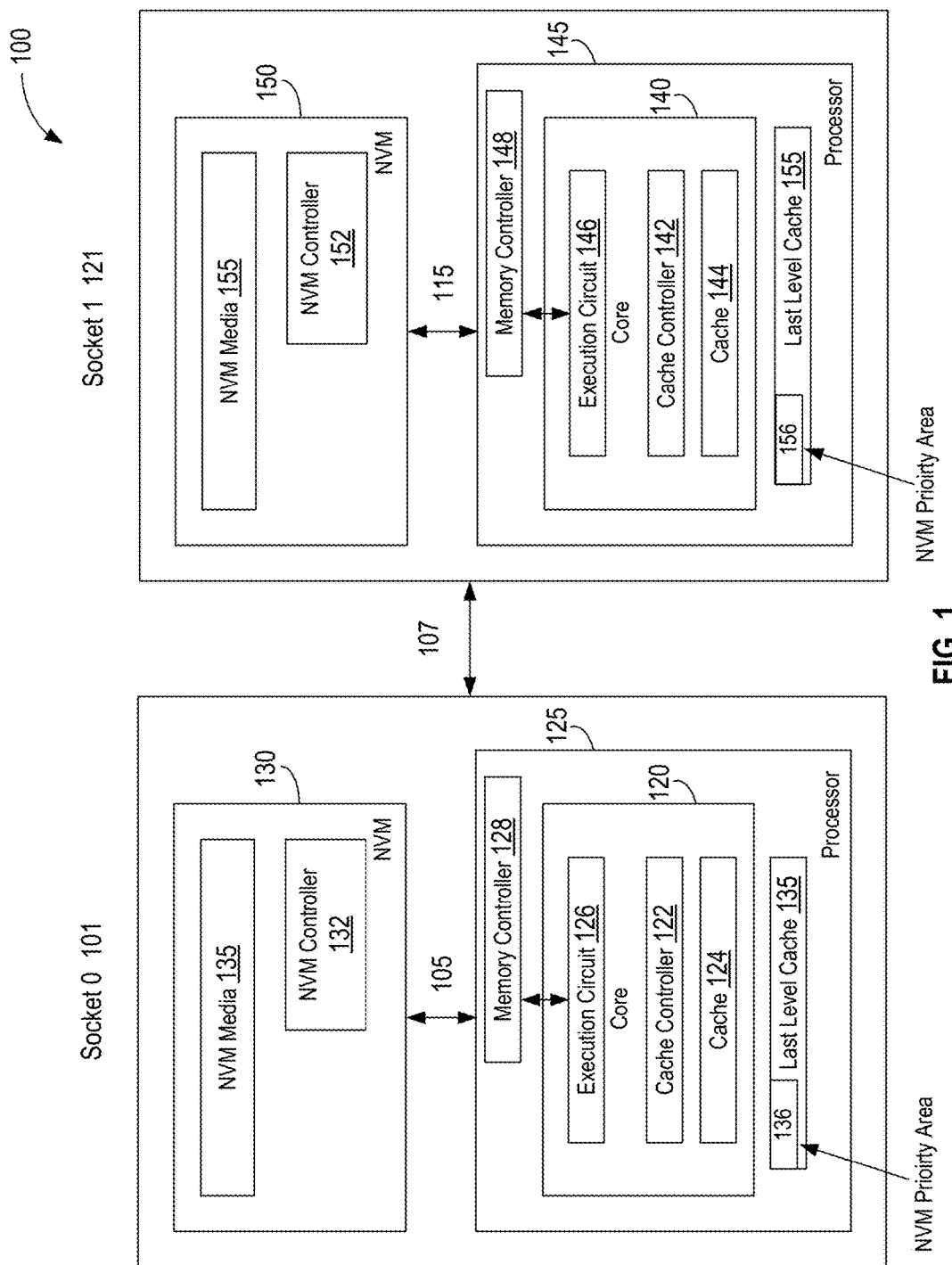
FIG. 1 illustrates a functional block diagram of a multi-processor computing system, in accordance with various embodiments.

In embodiments, an apparatus includes a cache controller (CC) and a LLC coupled to the CC, the CC to reserve a defined portion of the LLC where data objects whose home location is in a NVM are given placement priority. In embodiments, the CC monitors activity of the LLC, and determines a size of the defined portion, based, at least in part, on the activity. In embodiments, the CC further designates the defined portion of the LLC for exclusive storage of cache lines for data whose home location is the NVM.

In embodiments, an apparatus is further coupled to at least one lower level cache and a second LLC, and the CC further identifies modified data objects in the at least one lower level cache whose home location is in a second NVM, and in response to the identification, causes the modified data objects to be written from the lower level cache to the second LLC, the second LLC located in a same socket as the second NVM In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, the term "socket" may refer to a physical connector on a computer motherboard that may accept a single physical chip. A motherboard may have multiple sockets that can in turn accept multi-core chips.

As used herein, including in the claims, the term "chip" may refer to a physical integrated circuit (IC) on a computer. A chip in the context of this document may thus refer to an execution unit that can be single-core or multi-core technology.

As used herein, including in the claims, the term "processor" may refer to a logical execution unit on a physical chip. A multi-core chip may have several cores. As used herein the term "core" may refer to a logical execution unit containing an L1 (lowest level) cache and functional units. Cores are understood as being able to independently execute programs or threads.

In accordance with various embodiments, this disclosure addresses at least, inter alia, techniques that may reduce the complexity of providing EADR refresh capabilities. It is here noted that there may often be serious performance implications of having to flush modified data from processor caches. At the same time, this may often be something that software would be expected to do in order to ensure correct ordering of updates into NVM. Such a performance downside may be particularly unwelcome because the eventuality it is mainly protecting against, e.g., a sudden power-failure, is an extremely rare event. Thus, whatever protections are put in place generally diminish system performance on a continual basis, to prepare for something that may rarely, if ever, occur.

As noted above, one approach to this situation may include providing power for an EADR process to run, typically a battery/capacitor or other sources of power, so that the EADR process may operate long enough to cover flushing of all NVM-homed and modified cache lines out of processor caches. This approach effectively makes processor cache lines logically persistent upon writes becoming globally visible, and thus makes it sufficient for ordinary store fence (SFENCE) instructions to be inserted between antecedent and dependent data store instructions in an example program, without the requirement of cache line flush (CFLUSH) instructions to achieve desired consistency orderings.

However, providing for EADR across many different variations of infrastructure and platforms may be complicated. It may require very careful system design, and may need to anticipate and perform correctly even during worst case conditions where, at the time of a power failure, there may only be a finite amount of reserve power to push all modified cache lines into persistent memory. Further, the cache lines may be in any of the levels in the processor cache hierarchy at the instant when EADR is engaged, which must be taken into account when designing EADR backup power capacity.

It is further noted that when very large non-uniform memory access (NUMA) configurations are involved, it may be necessary to anticipate worst case memory latencies, unbalanced traffic flows towards memory, and therefore, worst case memory bandwidths. It is noted that NUMA is a computer memory design used in multiprocessing, where the memory access time depends on the memory location relative to the processor. Under NUMA, a processor can access its own local memory faster than non-local memory (memory local to another processor or memory shared between processors). The benefits of NUMA are limited to particular workloads, notably on servers where the data is often strongly associated with certain tasks or users.

Moreover, using EADR to flush all relevant cache lines system wide, as described above, may need to work even when worst case media conditions exist at NVM DIMMs. These conditions include, for example, write lockouts due to writes that were active but had not completed at any of a computing device's NVM DIMMs that adhere to the EADR design protocol when a power failure has occurred (write lockout is described in detail below with reference to FIG. 7). Thus, in such a situation, EADR would need to wait until the write lockout is cleared and then write the cache line to the NVM, which adds additional time that the backup power would need to support. Additionally, as processor cache sizes continue to grow in future processor generations, and as multiple different SKUs may be supported across common motherboard designs, requirements and validation complexities across many different variations may need to be considered.

One approach to deal with this complexity may be to standardize EADR designs for cloud infrastructures, such as, for example, Microsoft Azure™, where, by design, a power delivery infrastructure may be relied upon to furnish needed reserve power, and thus remove the pressure from individual system designs to meet required power needs following a failure. However, this may create multiple different failure conditions for software, e.g., those when explicit flushing can be elided and those when it cannot. This approach may also tend to fracture responsibilities when a workload migrates from cloud to on-premises, or vice-versa. Given that EADR is itself is a newer capability, and that many software stacks may now be designed for the first time to benefit from persistent memory such as NVM, the risk of compromising consistency so as to tread water on performance may be just too extreme.

It is further noted that an application that needs to keep data persistent and consistent in NVM may require elaborate software schemes. While programming burdens may be simplified by libraries that mimic database-like redo/undo logging, flushing, fencing, and ordering of updates (for example, pmem.io, which also performs thread state check pointing and lock generation counting), programmers desiring less overhead may need to implement such schemes on their own. It is noted that this may shift burdens onto programmers whose expertise lies in other areas than data management, and yet may expect them to get CLFLUSHes and SFENCEs right, and/or undertake different mixes of checkpoints and transactions. Moreover, doing so may complicate design patterns and require developers to wrestle simultaneously with multiple invariants (e.g., durability, recoverability, consistency, concurrency) that may need to be met at different granularities with locking, flushing, fencing, and transaction logging.

Given these concerns, as an alternative to the various approaches described above, in accordance with various embodiments, hardware and software functionalities may be used to significantly constrain the requirements that a post power failure EADR process may need to meet. These constraints being both on a needed amount of energy to be available in reserve as well as on a required duration of time for the energy to be available. Various embodiments may also provide the beneficial side effect of streamlining write back traffic into NVM, as described in detail below.

Thus, in accordance with various embodiments, modified cache lines may be concentrated into a fraction of an LLC by reserving a defined portion of the LLC in which modified cache lines homed in a given NVM have storage priority. Further, in addition or in the alternative, these cache lines may be kept close to their NVM "home" DIMMs by various remote cache controllers repatriating them to their home socket or processing unit. In embodiments, these two features, e.g., reserved portion of LLC for storing cache lines homed in NVM, and repatriation of modified cache lines to an LLC close to their "home" NVM, keeps such modified data objects close to the NVM to which they will be written back. In embodiments, these two features, whether one or both are used, may thus reduce the latency of write operations to a home NVM, bound the volume of writes, and extract better spatial and temporal locality both across and within the devices.

In embodiments, resource directing mechanisms, such as, for example, systems designed to provide a Quality-Of-Service (QoS), for example Intel's Resource Director Technology™ (RDT), may be used to reserve LLC priority areas for NVM homed memory objects. For example, in the case of RDT, this may be done in the AppDirect mode, where a certain amount of a LLC may be reserved that may be prioritized to hold data that resides in an associated NVM.

Once such a LLC priority area may be designated, in embodiments, if and when EADR is invoked, the amount of work EADR would need to perform in order to flush data out from LLC to home NVM may be vastly reduced.

FIG. 1 illustrates an example computer system 100 in accordance with various embodiments. With reference to FIG. 1, the example computer system may include two essentially identical sockets, socket 0 101 and socket 1 121. The two sockets may be coupled via interconnect 107, for example. For ease of illustration, in what follows, the two sockets will be described together, as they include identical elements. Moreover, the elements of socket 1 121 each have an index number that is 20 greater than the analogous element of socket 0 101, for easily tracking the corresponding elements of each socket. Thus, each socket may include a processor 125, 145. Each processor may, for example, include a core 120, 140, a LLC 135, 155, and a memory controller, 128, 148. Moreover, each core 120, 140 may include an execution circuit 126, 146, a cache controller 122, 142 that controls the various caches, including in-core caches 124, 144 as well as LLCs 135, 155.

Continuing with reference to FIG. 1, it is also noted that LLCs 135, 155 each have a NVM priority area 136, 156 set aside within them, where data homed in NVMs 130, 150 respectively are given placement priority. This, in accordance with various embodiments, locates NVM homed data closest to their home NVM, thereby facilitating efficient write-back to the home NVM. It is here noted that although caches 124, 144 are each shown as one block, they may, in embodiments, refer to a cache hierarchy, which may have multiple layers of caches, such as, for example L1 and L2 caches. As shown in FIG. 1, All interactions between the elements in 101 and 121, including cache controllers, are performed through the interconnect 107. Physically, it is noted, interconnect 107 may include several layers, all of which are logically represented by interconnect 107.

Continuing with reference to FIG. 1, execution circuits 126, 146 may be respectively coupled to memory controllers 128, 148. Moreover, processors 125, 145 may be respectively connected to system memory, which may include NVM module 130, 150. Each NVM module 130, 150, may include a NVM media 135, 155, and a NVM controller 132, 152, for example.

It is here noted that while FIG. 1 depicts an example two socket computing device, with one processor per socket, this is merely exemplary, and non-limiting. Thus, in other examples, a computing device may include only one socket, but within the single socket there may be multiple processors, each with its own cache hierarchy, LLC (with NVM priority area) and NVM module(s). Thus, just as the dual-socket example system of FIG. 1 has multiple units at a macro level, an individual computer may also have multiple units at a micro level. In either case, or in any combination of such cases, e.g., multiple sockets, where each socket has multiple processors, techniques and apparatus in accordance with various embodiments may be implemented to, for example, localize cached data items in an LLC closest to their home NVM, and minimize the portion of the LLC from which cache flushes to its associated NVM may be made upon the occurrence of a power failure.

Figure 2:
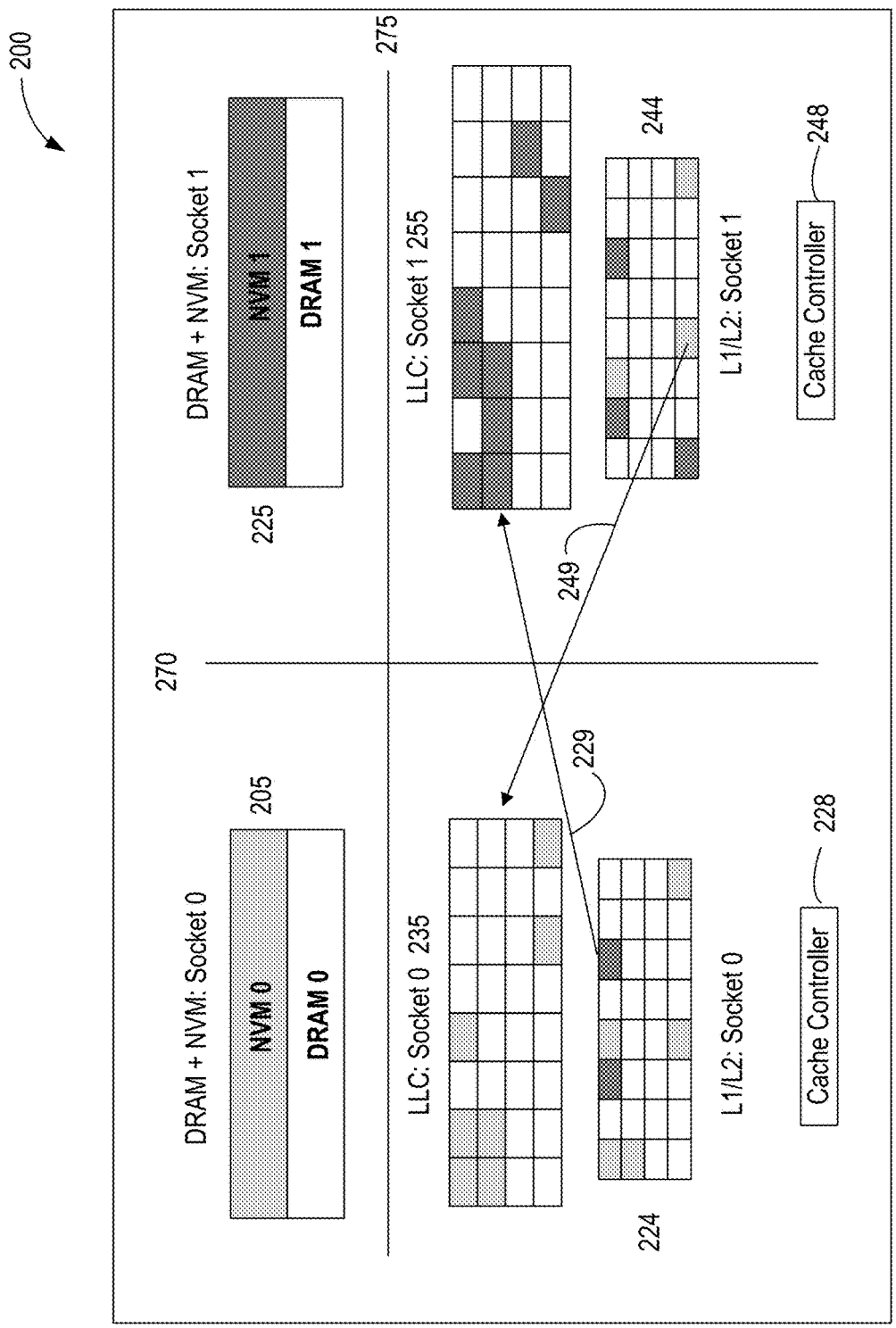
FIG. 2 illustrates "repatriating" modified data objects, whose home location is in a NVM of a first socket, from a lower level cache of a second socket to an LLC of the first socket, and vice versa, in accordance with various embodiments.

FIG. 2, next described, illustrates repatriation of NVM homed objects from a lower level cache of a remote socket to their home socket's LLC, in accordance with various embodiments. Thus, with reference to FIG. 2, a schematic of a multi-socket computing device 200 that includes two example sockets is shown. As noted above in the description of FIG. 1, techniques and apparatus in accordance with various embodiments may equally apply to a multiple socket computing device, as well as a single socket computing device with multiple processors, or a computing device with multiple sockets, and within each of the multiple sockets multiple processors. In either case, in embodiments, the time and energy required to flush cache lines to the NVM in which they are homed following a power failure may minimized, due to the management of caches in normal operation so as to keep data objects close to their home NVM, as described herein.

Continuing with reference to FIG. 2, computing device 200 may be understood as being similar to the computing device illustrated in FIG. 1, but shown here in FIG. 2 with only the elements necessary to describe a modified data object repatriation functionality, in accordance with various embodiments. The computing device schematically shown in FIG. 2 includes two sockets, which are schematically divided by vertical line 270. In a first socket, socket 0, there may be provided system memory that may include both DRAM 0 and NVM 0 205, and in a second socket, socket 1, there may be provided system memory that may include both DRAM 1 and NVM 1 225. It is noted that in each socket, there is a division between elements that reside on the processor and elements in system memory, and this division is shown schematically by horizontal line 275. Thus, in each processor there may be a LLC, as shown at 235 and 255, and at least one lower level cache, as shown at 224 and 244, which may include both an L1 cache and an L2 cache, as shown. In FIG. 2, data objects that are homed in NVM 0 of socket 0 are shown in a light grey color, and data objects that are homed in NVM 1 of socket 1 are shown in a darker grey color, so the two types of data may be easily distinguished.

Because a processor in any socket of a multi-socket computing device may modify any data object available on the device, there may be, for example, modified data that is homed in either of the two sockets in the example computing device of FIG. 2, as shown by the mixed data composition of L1/L2 caches 224 and 244 of sockets 0 and 1, respectively. Thus, each of lower level caches 224 and 244 may include some light grey data objects (homed in NVM 0), as well as some dark grey data objects (homed in NVM 1). As noted above, in the event of a power failure, an EADR process—running on backup power—would need to cause all of these modified data objects to be flushed to their home NVM, from wherever they are. The backup power demands in terms of both time and energy needed to accomplish this may be quite substantial.

In accordance with various embodiments, this situation may be prevented from occurring by cache controllers 228 and 248, on an ongoing basis, identifying remote data objects in cache hierarchies 224 of socket 0, and 244 of socket 1, and causing these remote data objects to be written to their respective home LLCs, instead of being moved to the LLC of the socket or processing unit they are currently in. It is here noted that the eviction rate of data objects from L1/L2 caches is under the control of an application (e.g., user control) and a system. Generally, data eviction from L1/L2 is frequent enough that dirty objects in these levels are not a concern from the perspective of various embodiments hereof. Moreover, if dirty objects in an L1/L2 cache have not yet been repatriated, in accordance with various embodiments, at the time of a catastrophic event, applications (programmers) may utilize an elaborate protocol to enable data consistency. If certain data objects are not written back, the consistency algorithms will run on system restart and recover the consistency.

Thus, continuing with reference to the example computing device of FIG. 2, cache controller 228 of socket 0 may identify data objects in cache hierarchy 224 of socket 0 that are homed in NVM 1 225 of socket 1, e.g., the dark grey boxes, and in response to the identification, cause them to be written to LLC socket 1 255, as shown by arrow 229, thereby repatriating them to socket 1. Similarly, cache controller 248 may identify data objects in cache hierarchy 244 that are homed in NVM 0 of memory 205 of socket 0, e.g., the light grey boxes, and in response to the identification, cause them to be written to LLC socket 0 225, as shown by arrow 249, thereby repatriating them to socket 0. These transfers may be understood as pseudo "cache line write back" (CLWB) transfers from the L1/L2 of one socket (or other processing unit) to an LLC of another socket (or other processing unit). Repatriating modified data objects to their home LLC thus insures that they are stored as close as possible to their home NVM.

It is here noted that the functionality illustrated in FIG. 2 may require more snoop traffic to manage the cache lines, but this is a second order effect which may be reduced considerably using NUMA optimizations.

In embodiments, the repatriation of remote data objects to their home socket LLC, as illustrated in FIG. 2, may be further optimized by specifying where in their home LLC cache they are ultimately stored. This is next described with reference to FIG. 3.

Figure 3:
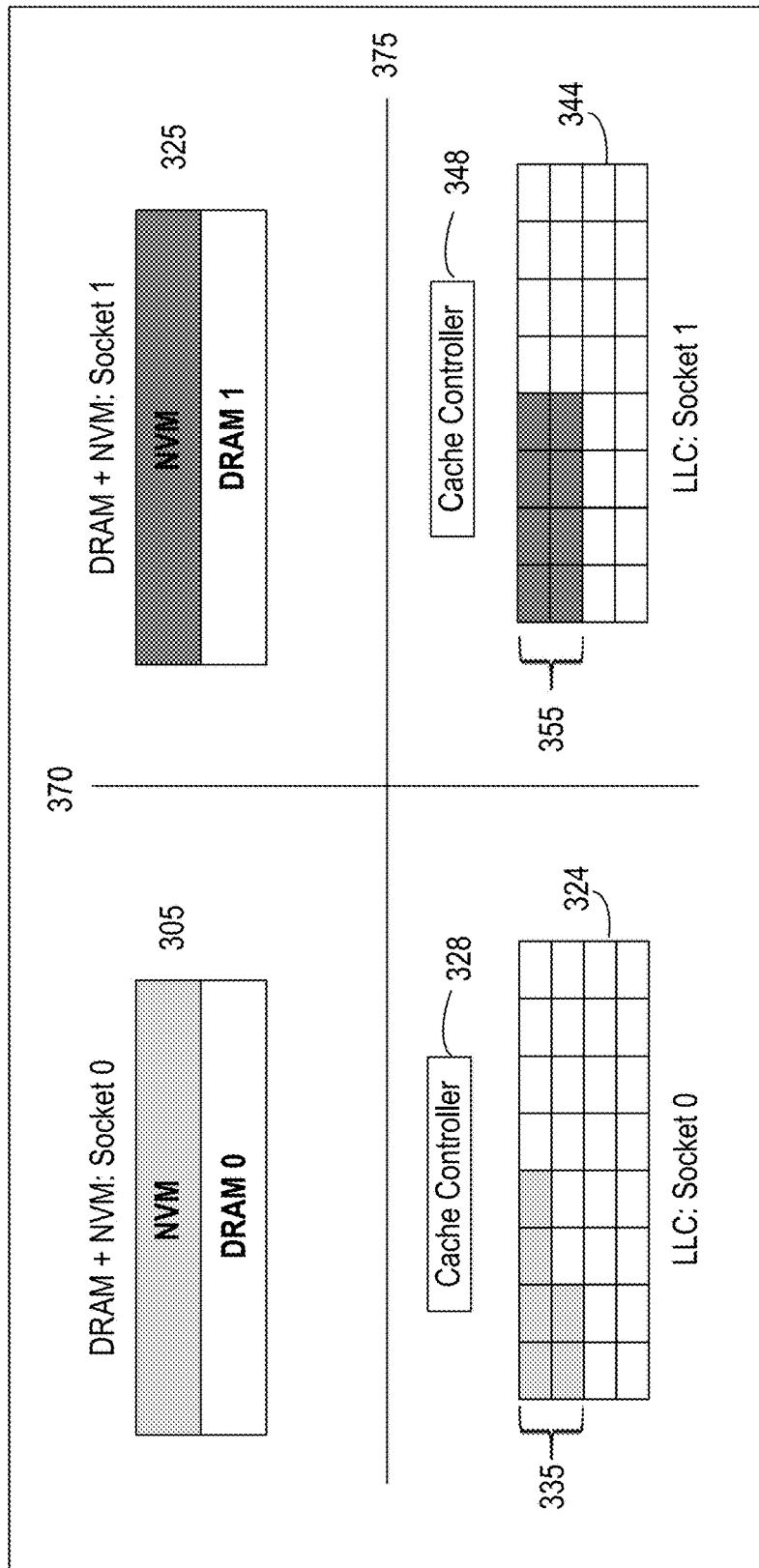
FIG. 3 illustrates a defined portion of a LLC in a socket of a computing device where data objects whose home location is in a NVM of that socket are given placement priority, in accordance with various embodiments.

With reference to FIG. 3, a reservation of LLC capacity for storage of NVM homed data objects is illustrated. FIG. 3 illustrates the example computing device of FIG. 2, but here just showing the LLCs. With reference to FIG. 3, each LLC has a defined area (shown, for example, in the upper left portion of each LLC) in which NVM homed objects may be stored, in accordance with various embodiments. These are shown at 335 in socket 0 and 355 in socket 1. In embodiments, these defined areas 335, 355 may be reserved within their respective LLCs by cache controllers 328 and 348, respectively. These areas may be sometimes referred to herein as "NVM priority areas."

Thus, in the event of a power failure, an EADR process may not need to look at all data locations in a LLC, but rather may flush data from the defined area 335 of LLC 324 into NVM 305 of socket 0, or, similarly, flush data from the defined area 355 of LLC 344 into NVM 325 of socket 1. By so restricting the activity of EADR, significantly less post-failure power resources may be required.

In embodiments, cache controllers 335 and 355 may reserve the defined area of the LLC, and, in embodiments, they may either designate the defined area as exclusive to NVM homed objects, or, for example, may just make storage of NVM homed data objects a priority in the defined area, so as not to block off that portion of the LLC from use by other data, such as, for example, data stored in DRAM.

In some embodiments, reservation of the defined priority area of the LLC may be implemented by extending a resource directing technology already enabled on the computer system, such as, for example, Intel's RDT', so that memory objects homed in NVM are given priority placement. It is here noted that the size of the defined area of the LLC that is reserved by the cache controller may need to be carefully chosen, as getting the sizing wrong may be problematic. For example, oversizing the defined area may tend to reduce effective LLC utilization, and undersizing the defined area may tend to cause more aggressive write-backs from the defined area to make space. Thus, in embodiments, other capabilities such as cache monitoring can be used to properly size this priority region.

As noted above, in some embodiments, the NVM priority area functionality illustrated in FIG. 3 may be implemented together with the repatriation functionality of FIG. 2, or, in other embodiments, independently. When both features are implemented together, with reference to FIG. 2, LLC socket 0 235 would only store the light grey data objects in the defined region, which may also be referred to as "the NVM priority area," such as, for example, defined region 335 of FIG. 3, and all repatriated (light grey) data objects from socket 1 would be stored in this defined region of LLC socket 0 235. Similarly, LLC socket 1 255 would only store the dark grey data objects in the defined region, such as, for example, defined region 355 of FIG. 3, and all repatriated (dark grey) data objects from socket 0 would be stored in this defined region of LLC socket 1 255.

By utilizing the functionalities illustrated in each of FIGS. 2 and 3, in embodiments, the behavior of memory and cache subsystems of an example computing device may thus be made NVM aware and NVM tuned.

It is noted that, in embodiments, reserving a certain amount of a LLC that will be prioritized to hold data that resides in an associated NVM may be accomplished with implementation specific methods. One such method would be to tag each cache line with information that names its origin (DRAM or NVM). In embodiments, the information provided by the tagging may be used to track the home location of any physical cache line.

In some embodiments, an additional optional capability may be implemented that may be specified by memory type range registers (MTRRs). In such embodiments, software may inform a processor when it may have an unconventionally high rate of write operations to NVM homed objects covered by specific MTRRs. In such cases, in embodiments, writes to such regions may be given their own exclusive priority regions in a LLC so that they may be absorbed quickly, and, further, more aggressively streamed towards NVM.

In some embodiments, performance monitoring unit (PMU) extensions may be used so that new events may be defined to track all traffic in and out of the NVM priority areas described above with reference to FIG. 3. In embodiments, these may, for example, be further used by software to more finely tune write-intensive algorithms to employ more coarse-grained streaming. This may be accomplished, for example, by writing into a DRAM alias, committing changes into a log, and then performing lazy writes to NVM home locations in the background, where lock based concurrency covers such lazy writes. It is here noted that, in embodiments, program and system profiling tools may use the PMU to understand the how hardware is reacting to software being executed.

It is here noted that one of the features of the PMU allows monitoring tools to track the address of memory operations that have particular characteristics. Thus, the PMU may provide the data address of an object that has 'bad' behavior, as well as the exact software code where the 'bad' behavior is instantiated. Tying these two pieces of information together, the tools, and thus a user, may have certitude as to which memory object causes write intensive operations to occur. In embodiments a user armed with this knowledge may change the software to implement the technique described above.

It is noted that, in embodiments, hardware profiling apparatus that may already be available in a given computing device may be used, and, in such embodiments, the repatriation to home LLC and LLC defined area features described above may be transparent to software. In some embodiments, as noted, resource directing mechanisms (e.g., Intel's RDT™) may be further extended to carve out needed LLC capacity, as well as to specialize cache monitoring to track the rate of NVM-homed writes.

Thus, as noted, in embodiments, the amount of work needed to flush deferred cache line flushes under EADR may be vastly reduced, and may be made more deterministic. In addition, write bandwidth may be improved, and write latencies reduced, both during normal operation and under EADR. In embodiments, EADR's rate of proactive writing may be adapted, thereby adapting deferred flushing to available EADR power, as well as to dynamic variations in workload behavior. In embodiments, such techniques may reduce the likelihood of encountering the write-lockout performance glass-jaws in NVM (described below with reference to FIG. 7), both during normal operation and during EADR.

Figure 6:
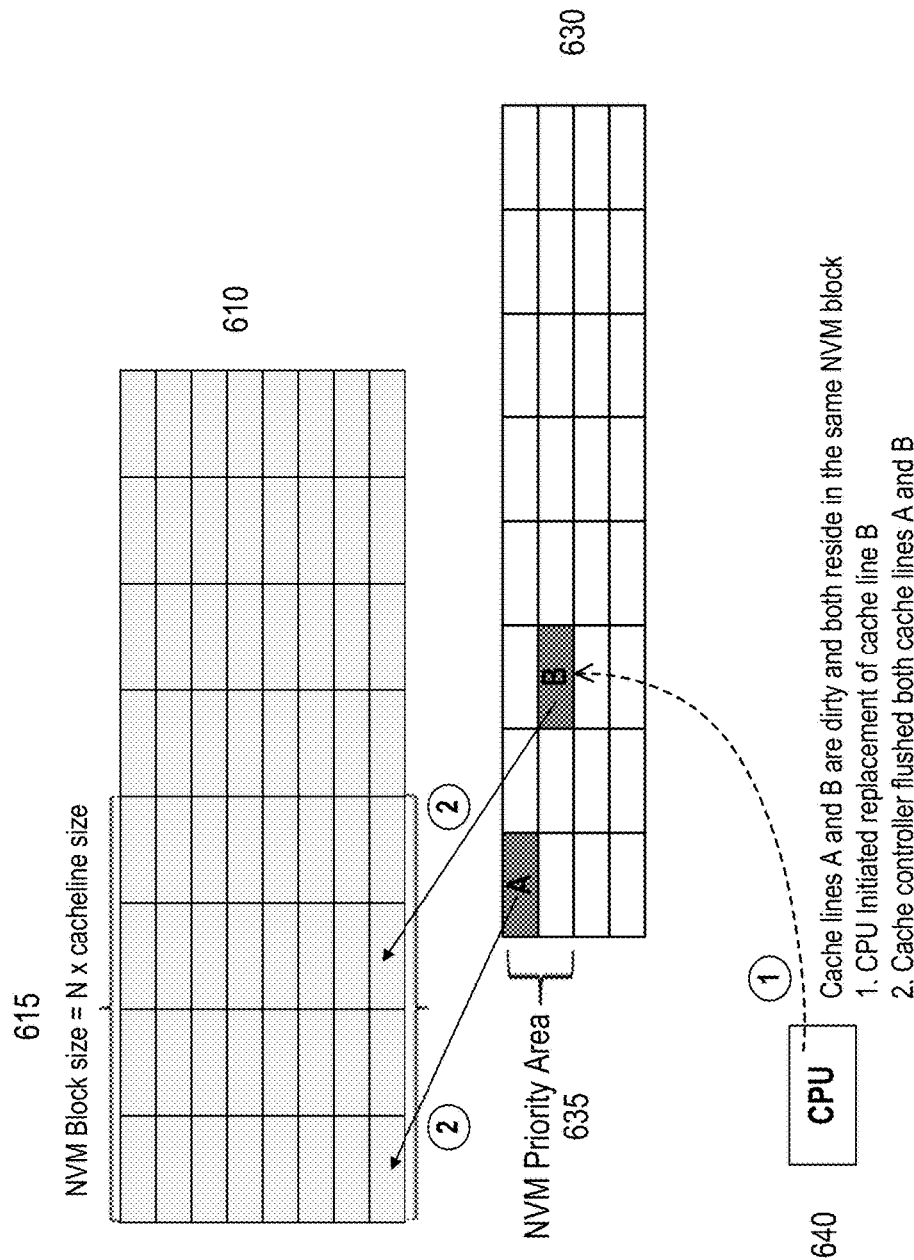
FIG. 6 illustrates writing modified data objects from two separate cache lines, which both reside in a same block of a NVM, from the LLC to the NVM in a block size transfer, in accordance with various embodiments.
Figure 7:
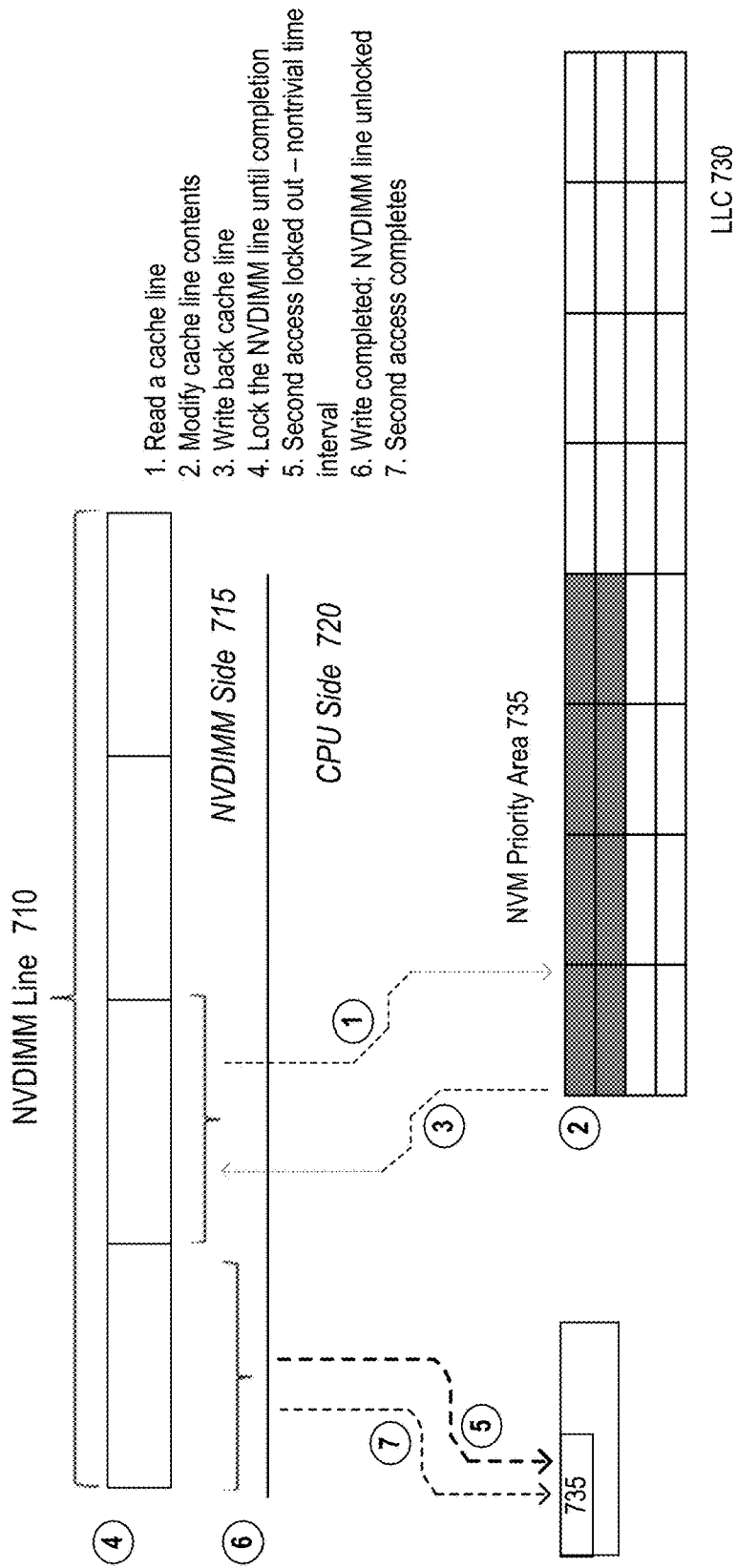
FIG. 7 illustrates a solution to the lockout of access to a NVM until an ongoing CPU initiated cache line write completes problem, in accordance with various embodiments.

In particular, two techniques that may be implemented in accordance with various embodiments may each help in reducing the write-lockout problem illustrated in FIG. 7. First, as regards the reservation of a NVM priority area, which may be understood as EADR enforced cache flushing, cache lines that belong to a single NVM block are stored in the same physical cache. Thus a given cache-controller may direct a memory controller to write both cache lines together, in essence generating a streaming write. Thus, write backs from cache to NVM may occur in a deliberate manner (dictated by the need to keep the number of modified cache lines in the reserved defined area) instead of just being a result of capacity evictions. In embodiments, this gives the cache controller an ability to batch together those cache lines that are adjacent to each other. Second, as regards the optimization of aging cache lines in the same block, as described below with reference to FIG. 6, when a cache line is flushed, its sibling cache line may also be flushed, which results in the same type of write as described above.

It is noted that without these techniques, cache lines may be flushed and written independently, and thus sibling cache lines would have a finite and non-trivial probability of generating the write-lockout situation illustrated in FIG. 7.

Moreover, as described above, in embodiments, the scope of EADR may be reduced to limited areas of the LLCs, thereby reducing system cost by requiring smaller capacitors and/or batteries with which to power post power failure EADR activity. Additionally, in embodiments, the complexity of having to identify all cache lines anywhere in the hierarchy at a time when the system is reacting to a catastrophe, may also be reduced.

It is here noted that software that may be configured to perform its own CLWB and SFENCE operations for greater safety may also benefit from the techniques according to various embodiments, because by the time the CLWB from software comes along, a computing device according to various embodiments may likely have already moved a cache line close to its home memory controller. Thus, in such embodiments, an actual CLWB may proceed faster, and SFENCE latency may be correspondingly much smaller. It is thus noted that this may create an atmosphere in which CLWBs become so inexpensive that negative effects on performance are no longer a concern.

Figure 4:
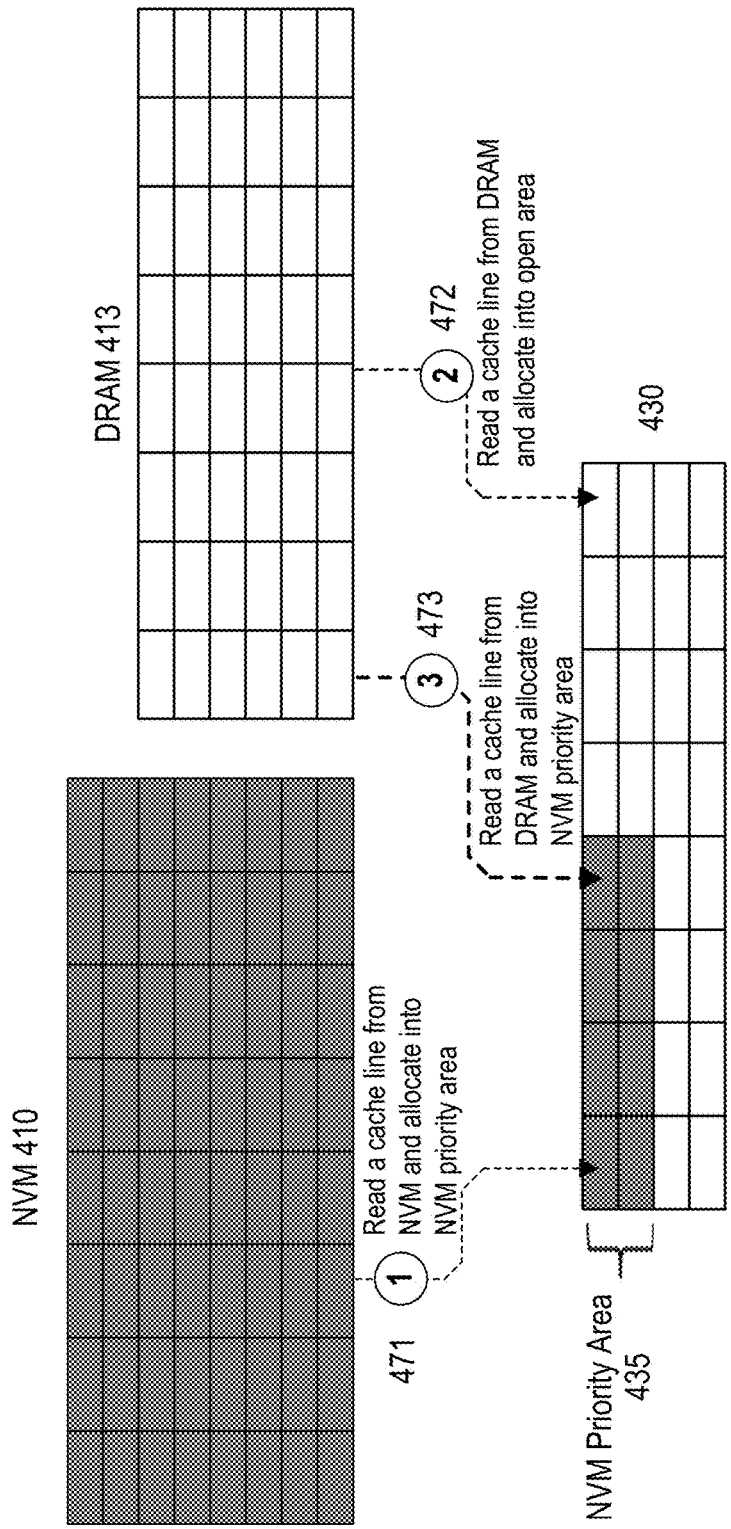
FIG. 4 illustrates NVM priority area storage preferences, in accordance with various embodiments.

FIG. 4 illustrates storage preferences for the NVM priority area of a given LLC, and how they may be used in the context of read operations from system memory, in accordance with various embodiments. With reference to FIG. 4, there is shown NVM 410 and DRAM 413, which may be part of system memory. There is also shown LLC 430, and a defined NVM priority region 435 within LLC 430, that has been reserved in accordance with various embodiments, as described above. Several optional read operations from system memory are also illustrated. Thus, in a first read operation 471, a cache line from NVM 410 may be read, and allocated into NVM priority area 435. This allocation may, in embodiments, be performed, for example, by a memory controller such as memory controller 128 of FIG. 1, acting in conjunction with a cache controller, such as cache controller 122 of FIG. 1, for example.

In a second read operation 472, a cache line from DRAM 413 may be read, and allocated into an open portion of LLC 430. In embodiments, where NVM priority area 435 is preferentially reserved for data objects or cache lines homed in NVM 410, read traffic into NVM 410 may, for example, bypass LLC 430 altogether. In such embodiments a given LLC may be more beneficially used for the much higher traffic read and write operations to DRAM. It is here noted that, in embodiments, if NVM priority area 735 is determined by hardware to be underutilized, then the priority area may be used for normal operations, for example, storage of DRAM homed objects.

Finally, as regards a third read operation 473, it is assumed that NVM priority area 435 was reserved so as to provide a preference to NVM homed objects, but was not designated as being exclusive to them. Therefore, a cache line read from DRAM 413 may also be allocated into NVM priority area 435, as shown by read operation 473.

Figure 5:
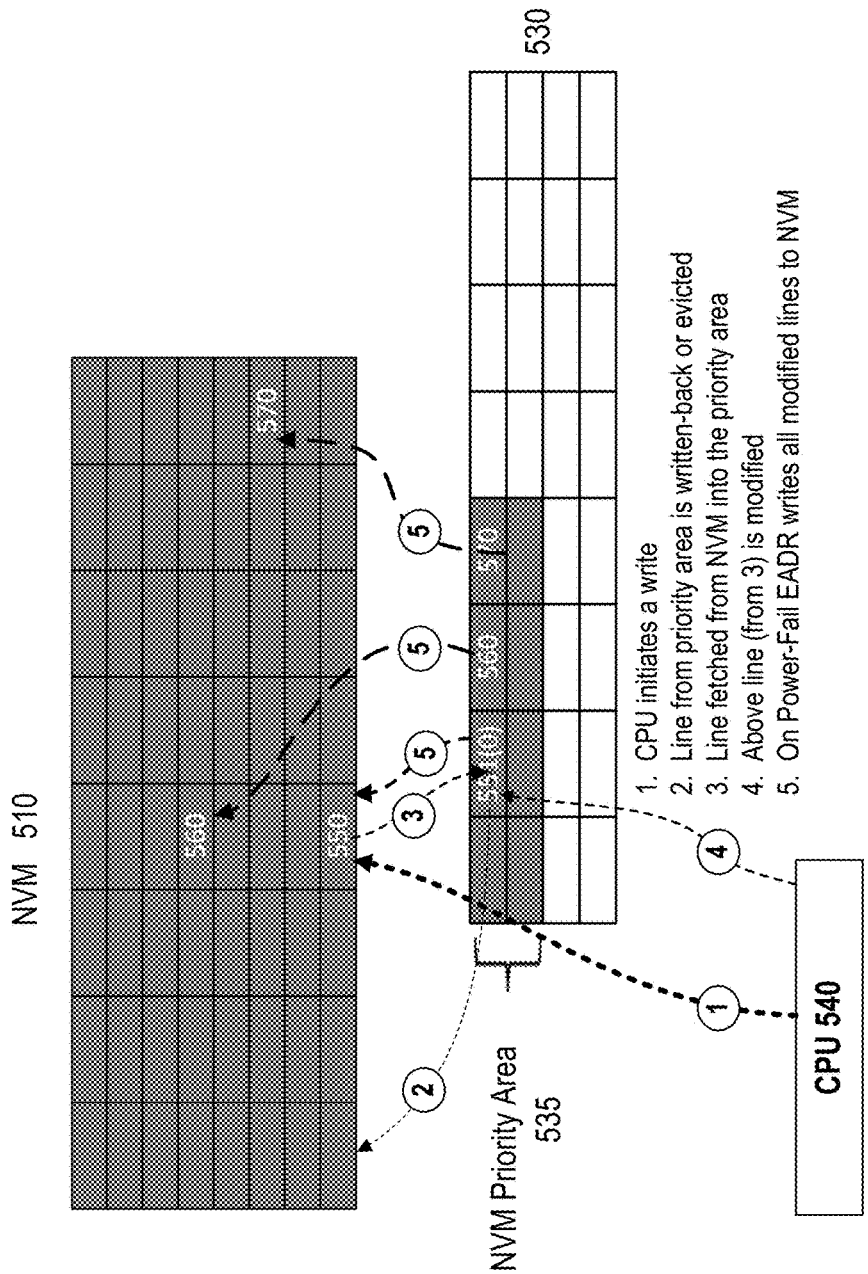
FIG. 5 illustrates an example write operation to a data object that is homed in NVM, and EADR workflows triggered upon power failure sensing, in accordance with various embodiments

FIG. 5 illustrates an example write to a data object that is homed in NVM, and EADR workflows that may be triggered upon power failure sensing, in accordance with various embodiments. With reference to FIG. 5, there is shown NVM 510, LLC 530, and CPU 540. As illustrated in previous figures, LLC 530 may have a reserved region for storing NVM homed data, NVM priority area 535. As illustrated in FIG. 5, the pseudo-CLWB repatriations in each socket's LLC (according to the process illustrated in FIG. 2, described above), may, in embodiments, be converted into actual (but autonomous) CLWBs from NVM priority area 535. Thus, in embodiments, modified NVM-homed objects may be aged more quickly for cleaning by LLC 530, and, it is noted, once cleaned, may be accelerated for eviction unless the write traffic into NVM is well below some threshold, as may be set by software. Thus, in embodiments, LLC 530 may age out dirty NVM sourced cache lines faster than normal DRAM sourced cache lines. For example, NVM sourced dirty cache lines may be tagged in LLC 530, by a cache controller that manages LLC 530, for priority write back relative to other data stored in the LLC that is not so tagged. It may often be the case that objects that reside in NVM may, in general, be regarded as cold, and thus, a faster write back of dirty cache lines should not result in a performance penalty. In embodiments, besides clearing up space in NVM priority area 535, this accelerated aging may further reduce the amount of data that needs to be flushed peremptorily under a catastrophic event.

Continuing with reference to FIG. 5, five tasks that may be performed in connection with a CPU initiated write to a cache line in a NVM are depicted. These tasks are labelled as "1" through "5" in the figure. At 1, CPU 540 may initiate a write operation to a data object within cache line 550 of NVM 510. In response, at 2, a memory controller, such as, for example, either of memory controllers 128, 148 of FIG. 1, may cause a cache line 551 from the NVM priority area 535 of LLC 530 to be written back to its home location in NVM 510, so as to make room for cache line 550 which is the subject of the write. Cache line 551 is written back, because, as noted above, it has been modified, and thus aged more quickly for cleaning. It is noted that such a write back to NVM from a LLC to make room for an incoming cache line may sometimes be referred to as an "eviction."

Following the eviction of modified cache line 551, and thus its location now being available, at 3 the memory controller may fetch cache line 550, from NVM 510 into NVM priority area 535, as shown. Thus, at this point cache line 550 is actually occupying the location, indicated by labelling the location "551(0)" to indicate the progression over time. Once the data object is in LLC 530, in particular in NVM priority area 535, at 4, CPU 540 may modify the data object, and thus cache line 550. At this point, until it is evicted, cache line 550 may remain in NVM priority area 535. As noted above, being modified by CPU 540, it may be tagged to age more quickly than other cache lines in NVM priority area 535. However, if a power failure occurs prior to its being cleaned from the priority area, an EADR process may, at 5, write all modified cache lines in NVM priority area 535 back to their home locations in NVM 510, as shown, which include cache lines 550, 560 and 570, as shown.

As noted above in connection with FIG. 5, modified data objects in a NVM priority area may, in embodiments, be aged more quickly to hasten their being evicted, to update the NVM. However, these modified data objects are still transferred one by one. A further optimization is next described, with reference to FIG. 6.

FIG. 6 illustrates an example group aging optimization that may be provided in some embodiments. In this optimization, instead of writing and flushing to a home NVM in units of single cache lines, in embodiments, hardware-based group-writes, involving multiple cache lines from the same NVM block, for example, including a 256 byte range, may be performed. In these embodiments, this may allow for the avoidance of a "glass jaws" type write-lockout (described below with reference to FIG. 7). The example block transfer to NVM may avoid the write-lockout both during normal operation when write backs to NVM may be performance critical, as well as during catastrophic events (e.g., power failure) when they may be both latency and power critical. It is here noted that CPUs may routinely perform adjacent sector prefetching, as known. In embodiments, a similar approach may be utilized to write back cache lines into an example NVM priority region when CPU hardware may detect sequentially local writes, so that space may be proactively set aside in the NVM priority region when spatially local writes to NVM are detected.

Continuing with reference to FIG. 6, the depicted computing device includes NVM 610, and LLC 630, with NVM priority area 635. Additionally, within NVM 610 there may be an example NVM block, which may include N cache lines, as shown. For example, N may equal 32, as shown at 615 (each block represents one cache line). In embodiments, if multiple cache lines within the same NVM block line, such as example cache lines A and B shown in FIG. 6, are live within LLC 630, then they may be aged together, where, for example, the age being tracked may be that of the oldest cache line. Alternatively, it may be that of the youngest cache line.

Thus, at 1, CPU 640 may initiate a replacement of cache line B. Because cache lines A and B are both dirty, and because they both reside in NVM block 615, when CPU 640 initiates replacement of cache line B, in embodiments, a cache controller (which is in charge of aging, and thus flush control) may also flush cache line C. In embodiments, this may obviate the "glass jaw" problem, which is next described with reference to FIG. 7.

FIG. 7 illustrates in detail the "glass jaw" problem, which is lockout of access to NVM until an ongoing CPU initiated cache line write completes, and how this problem is solved in accordance with some embodiments. With reference thereto, FIG. 7 shows NVM DIMM line 710, in which there may be persistently stored several cache lines containing data. There is also shown LLC 730, which may be further provided with NVM priority area 735, in which several cache lines homed in NVM 710 may be temporarily stored. Seven tasks are also illustrated in FIG. 7, labelled "1" through "7", as follows, which collectively illustrate the denial of access to NVM 710 as long as a previous but still pending write back of a cache line has not completed.

With reference to the seven tasks, at 1, a cache line may be read from NVM 710. In accordance with various embodiments, using the functionality illustrated in FIG. 3, the cache line may be stored in NVM priority area 735. At 2, the contents of that cache line may be modified. At 3, the now modified cache line may be written back to NVM 710. However, until that write-back completes, no further accesses of NVM 710 are permitted. Thus, continuing with reference to FIG. 7, at 4, NVM 710 may be locked, and, as a result, a second access attempted at 5, may be locked out from accessing NVM 710, for some non-trivial time interval. Only once the write-back to NVM 710 completes, may NVM 710 be unlocked, and thus, at 7, the second reattempted access to NVM 710, which failed at 5, may succeed.

However, in embodiments that implement the example group aging optimization described above with reference to FIG. 6, the entire block may be read, so that the first and second accesses may occur together, without waiting for a write-back. In such embodiments, reads and writes occur at the NVM block level. It is here reiterated that an NVM block is composed of multiple cache lines. Thus, while a CPU may operate on a cache line granularity, in embodiments, the NVM may operate on a block granularity, as shown in FIG. 6.

Figure 8:
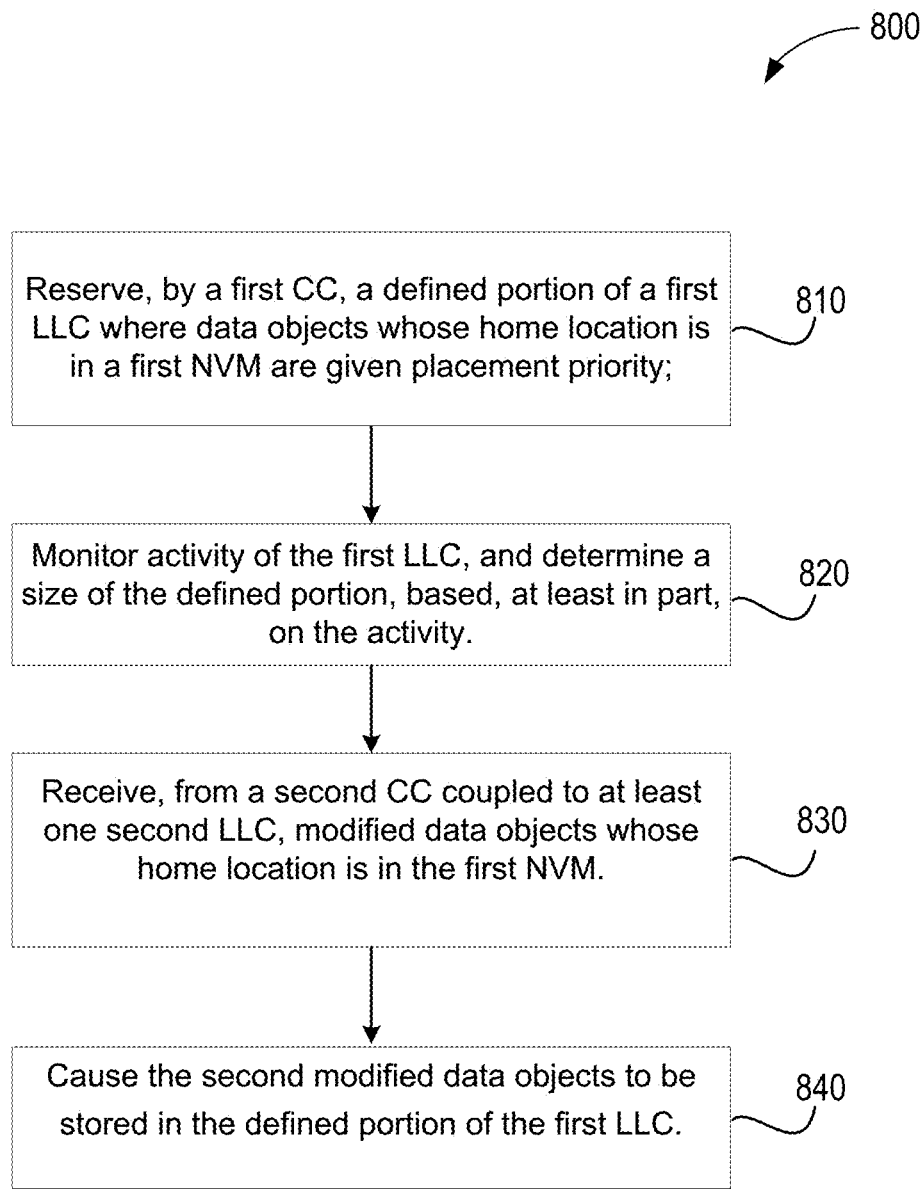
FIG. 8 illustrates an overview of the operational flow of a process for reserving a defined portion of a LLC where data objects whose home location is in a NVM are given placement priority, in accordance with various embodiments.

Referring now to FIG. 8, an overview of the operational flow of a process for reserving a defined portion of a LLC where data objects whose home location is in a NVM are given placement priority, in accordance with various embodiments, is presented. Process 800 may be performed, for example, by an apparatus such as cache controller 122, or cache controller 142, respectively, shown in FIG. 1. Process 800 may include blocks 810 through 840. In alternate embodiments, process 800 may have more or less operations, and some of the operations may be performed in different order. Process 800 may be performed by a CC provided in one socket, either Socket 0 101 or Socket 1 103, such as CC 122 or 142, respectively, in accordance with various embodiments.

Process 800 may begin at block 810, where a first CC may reserve a defined portion of a first LLC. The first LLC may be LLC 135 of FIG. 1, for example, or for example, LLC 155, and the defined portion either 136 or 156, as shown in FIG. 1. In the defined portion of the first LLC, data objects whose home location is in a first NVM are given placement priority. As described above, they may be given even more than a mere priority. For example, the defined portion may be NVM Priority Area 435, 535 or 635, as shown in FIGS. 4, 5 and 6, respectively. In some embodiments, the defined portion of the first LLC may be designated as being exclusively reserved for such data objects.

From block 810, process 800 may proceed to block 820, where the first CC may monitor activity of the first LLC, and may determine the size of the defined portion, based, at least in part, on the activity. In embodiments, process 800 may perform block 820 prior to the initial reservation of the defined portion, at block 810, or may, at block 810, set a default size of the defined portion, based on prior statistics or user set values, and then, at block 820, verify that then current activity either matches the defined portion size, or requires an adjustment to it.

From block 820, process 800 may proceed to block 830, where the first CC may receive, from a second CC coupled to at least one second LLC, modified data objects whose home location is in the first NVM. For example, as shown in FIG. 1, process 800 may be performed by a CC provided in one socket, either Socket 0 101 or Socket 1 103, such as CC 122 or 142, respectively. The CC may reserve the defined portion of an LLC in their own socket, for example, defined area 136 of LLC 135 or defined area 156 of LLC 155, respectively, for data objects that are homed in NVM in their own socket, such as, for example, NVM media 135 or 155, respectively. Then, at block 830, they may receive the modified data objects from the other CC, e.g., the CC of the other socket than their socket, where the received modified data objects coming back from the other socket are also homed in the CC's socket. These modified data objects happen to have been processed by the processor of the other socket, and therefore were stored in a lower level cache of the other socket. For example, if process 800 is performed by CC 122 of socket 0 of FIG. 1, then at block 830 of process 800 CC 122 may receive, from CC 142 of socket 1 of FIG. 1, modified data objects that are homed in a NVM of socket 0, e.g., NVM media 135. It is noted that this relates to a "repatriation" task, as described above, being performed by the second CC to "repatriate" modified data from a non-home socket (socket 1) back to its home socket (socket 0).

From block 830, process 800 may proceed to block 840, where the first CC may cause the second modified data objects to be stored in the defined portion of the first LLC. Thus, given that at block 810 the defined portion of the first LLC was reserved, any data objects homed in the first NVM may be "repatriated" to the first LLC.

Figure 9:
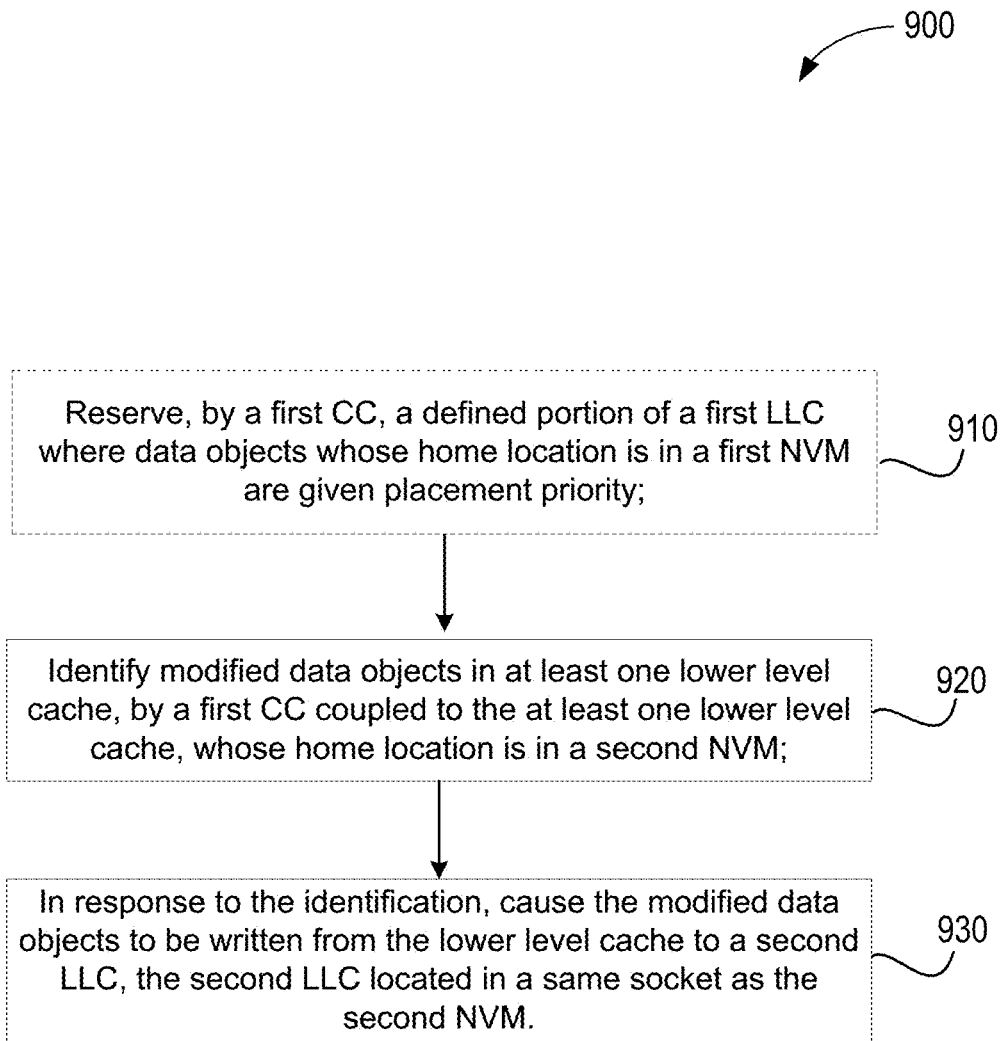
FIG. 9 illustrates an overview of the operational flow of a process for identifying modified data objects in a lower level cache of one socket, whose home location is in a NVM of another socket, and causing the modified data objects to be written form the lower level cache to a LLC of the other socket, in accordance with various embodiments.

Referring now to FIG. 9, an overview of the operational flow of a process for identifying modified data objects in a LLC whose home location is in a NVM of another socket, and causing the modified data objects to be written from the LLC to a LLC of the other socket, in accordance with various embodiments, is presented. Process 900 is an inverse "repatriation" process to that illustrated in blocks 830 and 840 of FIG. 8, where, in process 900, "alien" modified data objects are sent to their home socket, circuit, core or processor. As was the case with process 800, process 900 may be performed by a CC provided in one socket, either Socket 0 101 or Socket 1 103, such as CC 122 or 142, respectively, in accordance with various embodiments. Process 900 may include blocks 920 and 930, and may optionally include block 910. In alternate embodiments, process 900 may have more or less operations, and some of the operations may be performed in different order.

Process 900 may optionally begin at block 910, where a first CC may reserve a defined portion of a first LLC, where data objects whose home location is in a first NVM are given placement priority. As noted above, these data objects may each be given even more than a mere priority; and in some embodiments, the defined portion of the first LLC may be designated as being exclusively reserved for such data objects. Block 910 is thus equivalent to block 810 of FIG. 8, described above, and need not be described again here.

However, it is noted, it is not necessary to perform the task of block 910 in order to perform the related, but separate, tasks of blocks 920 and 930 of process 900. In fact, in alternate embodiments, repatriation of "alien" data to a LLC of their home socket, circuit, core, or processor, as the case may be, e.g., in which the NVM in which they are homed is provided, may occur without the CC first reserving a defined portion of a LLC in which to store data objects that are homed in its own home socket, circuit, core, or processor, as the case may be.

From optional block 910, if performed, process 900 may proceed to block 920, where the CC may identify modified data objects in at least one lower level cache that is coupled to the CC, whose home location is in a second NVM, e.g., a NVM that is not in the same socket, circuit, core, or processor, as the case may be, as the first CC.

From block 920, process 900 may move to block 930, where, in response to the identification, the CC may cause the modified data objects to be written from the lower level cache to a second LLC, the second LLC located in a same socket as the second NVM. It is here noted that process 900 is agnostic to whether or not the second LLC has a reserved defined portion in which data objects whose home location is in the second NVM are given placement priority. In embodiments, both options may be supported, and it is not necessary that a single option be implemented across all sockets, for example, in a multiple socket system. Rather, in embodiments, different systems may reserve such defined portions of LLCs in some processing units, and not do so in others. As a result, in some embodiments, a process such as process 900 may further include a query block, which may first determine whether or not a destination LLC has or does not have a reserved defined portion of its LLC set aside for storage of data objects homed in an NVM of that LLC's socket. Process 1000, illustrated in FIG. 10, next described, is such an enhanced version of process 900.

Figure 10:
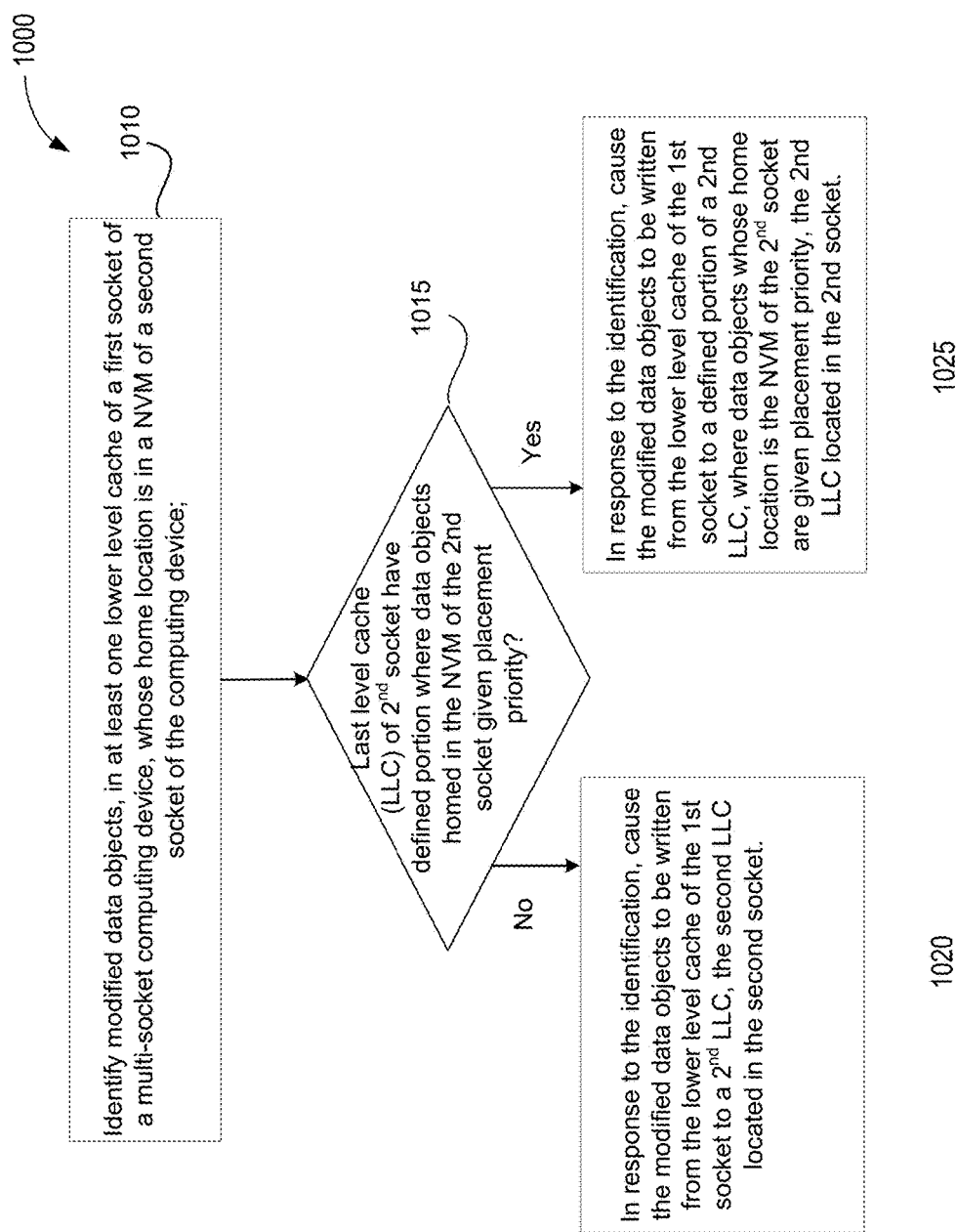
FIG. 10 illustrates an overview of the operational flow of an alternate process for identifying modified data objects in a lower level cache whose home location is in a NVM of another socket, in accordance with various embodiments.

Referring now to FIG. 10, an overview of the operational flow of an alternate "repatriation" process for identifying modified data objects in a lower level cache whose home location is in a NVM of another socket, and causing them to be stored in a LLC of their home socket, in accordance with various embodiments, is presented. It is here noted that process 1000 is similar to repatriation process 900 of FIG. 9, except that process 1000 first determines if the LLC in the home socket of the data to be repatriated has a reserved NVM priority area, and if so, it stores it there. Thus, process 1000 checks if both of the features illustrated in FIGS. 2 and 3 are operative.

Process 1000 may include blocks 1010 through 1025. In alternate embodiments, process 1000 may have more or less operations, and some of the operations may be performed in different order. As was the case with processes 800 and 900, process 1000 may be performed by a CC provided in one socket of a multi-socket computing device, such as, for example, either CC 122 of Socket 0 101, or for example, CC 142 of Socket 1 103, as shown with reference to FIG. 1, respectively, in accordance with various embodiments.

Process 1000 may begin at block 1010, where modified data objects in at least one lower level cache of a first socket of a multi-socket computing device may be identified, whose home location is in a NVM of a second socket of the computing device.

From block 1010, process 1000 may move to query block 1015, where it may be determined if a LLC of the second socket has a defined portion where data objects whose home location is in the NVM of the second socket are given placement priority. For example, it may be determined at query block 1015 if the second socket has an LLC such as LLC 430, 530 and 630, which has a defined portion such as NVM Priority Area 435, 535 or 635 in each of FIGS. 4, 5 and 6, respectively.

If the query at block 1015 returns a "No", then process 1000 may move to block 1020, where, in response to the identification, the CC may cause the modified data objects to be written from the lower level cache of the first socket to a second LLC, the second LLC located in a same socket as the second NVM. Because the return at query block 1015 was "No", these modified data items may be written anywhere in the LLC of the second socket, as shown, for example in FIG. 2.

If, however, the return query at block 1015 is "Yes", then process 1000 may move to block 1025, where, in response to the identification, the CC may cause the modified data objects to be written from the lower level cache of the first socket to a defined portion of the second LLC where data objects whose home location is the second NVM are given placement priority, the second LLC being located in the same socket as the second NVM. Because the return at query block 1015 was "Yes", these modified data items may be written to the defined area of the second LLC, as shown, for example in NVM priority areas 335 and 355 of FIG. 3.

It is here noted that process 1000 is agnostic to whether or not the second LLC has a NVM priority area in which data objects whose home location is in the second NVM are given placement priority. Thus, as noted, the aspects or features illustrated in FIGS. 2 and 3 may be combined, or be implemented independently. In embodiments, both options may be supported, and it is not necessary that a single option be implemented across all sockets, for example, in a multiple socket system. Rather, in embodiments, different systems may reserve such defined portions of LLCs in some processing units, and not do so in others.

Figure 11:
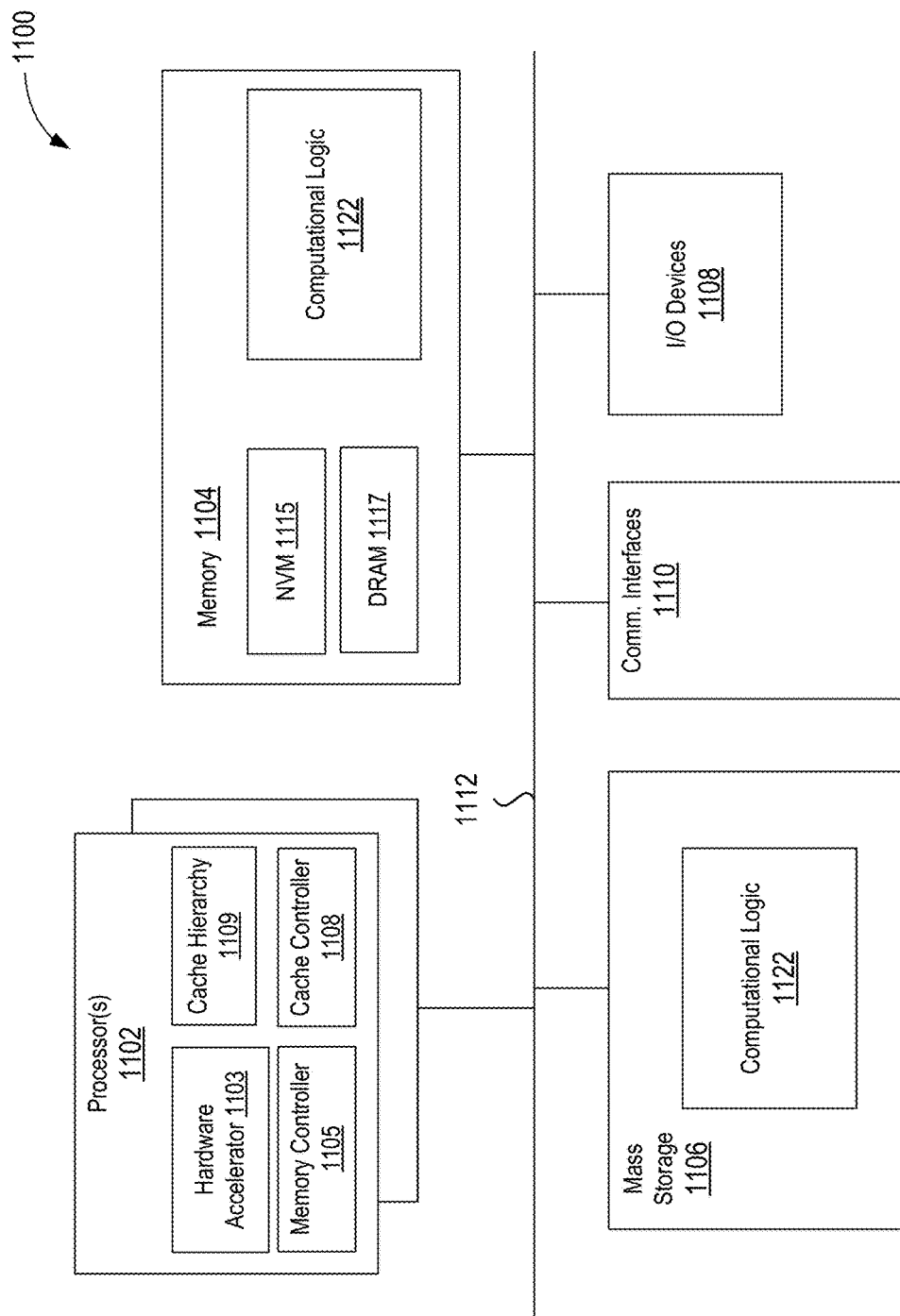
FIG. 11 illustrates a block diagram of a computer device suitable for practicing the present disclosure, in accordance with various embodiments.

Referring now to FIG. 11 wherein a block diagram of a computer device suitable for practicing the present disclosure, in accordance with various embodiments, is illustrated. Depending on the components included, computer device 1100 may be used as Socket 0 101, or Socket 1 103, shown in FIG. 1 and described above. As shown, computer device 1100 may include one or more processors 1102, and system memory 1104. Each processor 1102 may include one or more processor cores, and optionally, hardware accelerator 1105. An example of hardware accelerator 1105 may include, but is not limited to, programmed field programmable gate arrays (FPGA). Each processor 1102 may include memory controller 1105, a cache hierarchy 1109 which may include one or more levels of caches, e.g., L1/L2 and a LLC, and cache controller 1108. In embodiments, system memory 1104 may include any known volatile or non-volatile memory. Thus, system memory 1104 may include nonvolatile memory (NVM) 1115, in addition to, or in place of, other types of RAM, such as dynamic random access memory DRAM 1117, as described above.

Additionally, computer device 1100 may include mass storage device(s) 1106 (such as solid state drives), input/output device interface 1108 (to interface with various input/output devices, such as, mouse, cursor control, display device (including touch sensitive screen), and so forth) and communication interfaces 1110 (such as network interface cards, modems and so forth). In embodiments, communication interfaces 1110 may support wired or wireless communication, including near field communication. The elements may be coupled to each other via system bus 1112, which may represent one or more buses. In the case of multiple buses, they may be bridged by one or more bus bridges (not shown).

Each of these elements may perform its conventional functions known in the art. In particular, system memory 1104 and mass storage device(s) 1106 may be employed to store a working copy and a permanent copy of the executable code of the programming instructions of an operating system, one or more applications, and/or various software implemented components of aspects of socket 0 or socket 1, of FIG. 1, including, for example, programmable aspects of memory controller 128, 148 or cache controller 122, 142, collectively referred to as computational logic 1122. The programming instructions implementing computational logic 1122 may comprise assembler instructions supported by processor(s) 1102 or high-level languages, such as, for example, C, that can be compiled into such instructions. In embodiments, some of computing logic 1122 may be implemented in hardware accelerator 1103.

The permanent copy of the executable code of the programming instructions or the bit streams for configuring hardware accelerator 1103 may be placed into permanent mass storage device(s) 1106 and/or hardware accelerator 1103 in the factory, or in the field, through, for example, a distribution medium (not shown), such as a compact disc (CD), or through communication interface 1110 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 1110-1112 may vary, depending on the intended use of example computer device 1100, e.g., whether example computer device 1100 is a cloud server, smartphone, tablet, ultrabook, a laptop, a server, a set-top box, a game console, a camera, and so forth, used to implement one of Socket 1 or Socket 2. The constitutions of these elements 1110-1112 are otherwise known, and accordingly will not be further described.

Figure 12:
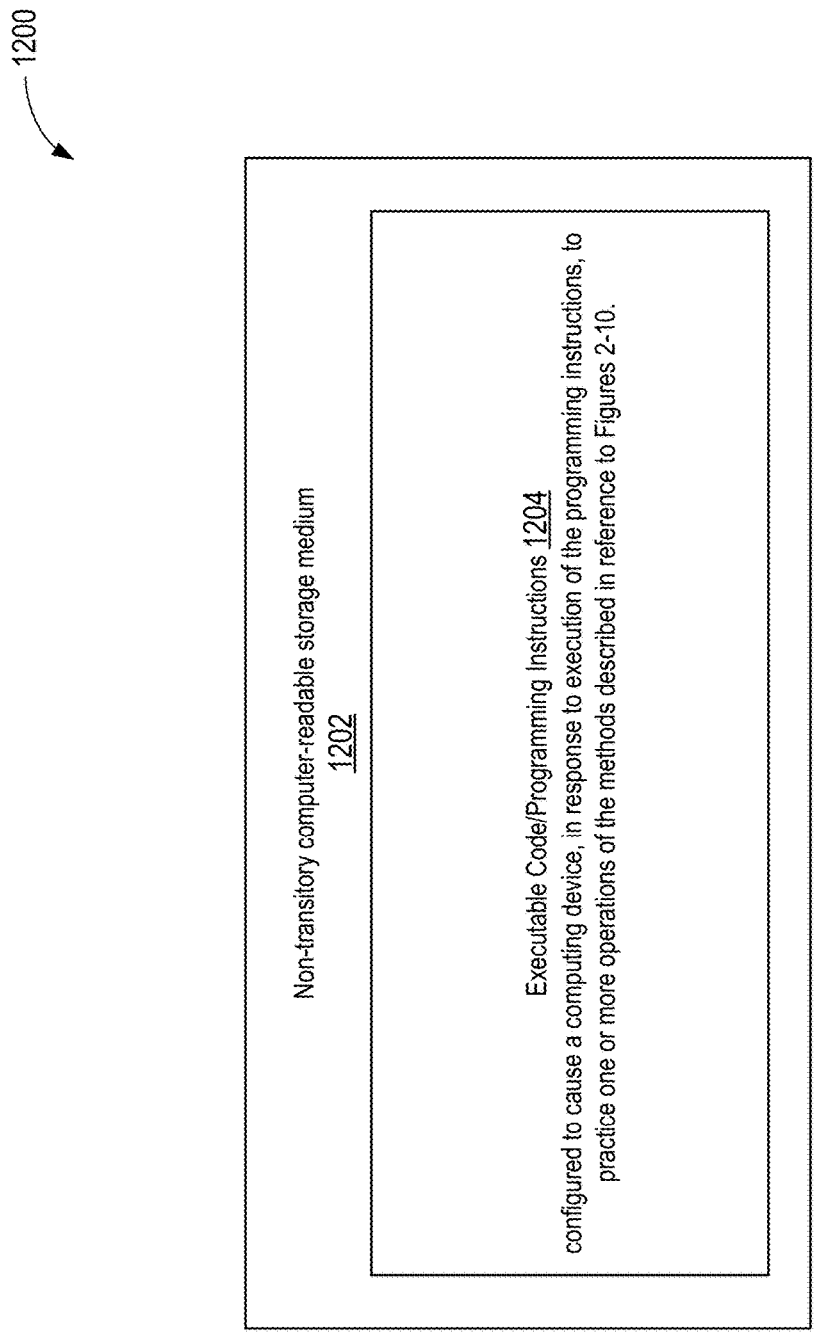
FIG. 12 illustrates an example computer-readable storage medium having instructions configured to practice aspects of the processes of FIGS. 2-10, in accordance with various embodiments.

FIG. 12 illustrates an example computer-readable storage medium having instructions configured to implement all (or a portion of) software implementations of aspects of, or programs running on, socket 0 101 or socket 1 103 of FIG. 1, including, for example, programmable aspects of memory controller 128, 148 or cache controller 122, 142, and/or practice (aspects of) processes 200 of FIG. 2, 300 of FIG. 3, 400 of FIG. 4, 500 of FIG. 5, 600 of FIG. 6, 700 of FIG. 7, 800 of FIG. 8 and 900 of FIG. 9, earlier described, in accordance with various embodiments. As illustrated, computer-readable storage medium 902 may include the executable code of a number of programming instructions or bit streams 904. Executable code of programming instructions (or bit streams) 904 may be configured to enable a device, e.g., computer device 1100, in response to execution of the executable code/programming instructions (or operation of an encoded hardware accelerator 1105), to perform (aspects of) processes 200 of FIG. 2, 300 of FIG. 3, 400 of FIG. 4, 500 of FIG. 5, 600 of FIG. 6, 700 of FIG. 7, 800 of FIG. 8 and 900 of FIG. 9. In alternate embodiments, executable code/programming instructions 1104 may be disposed on multiple non-transitory computer-readable storage medium 1102 instead. In embodiments, computer-readable storage medium 1102 may be non-transitory. In still other embodiments, executable code/programming instructions 1104 may be encoded in transitory computer readable medium, such as signals.

Referring back to FIG. 11, for one embodiment, at least one of processors 1102 may be packaged together with a computer-readable storage medium having some or all of computing logic 1122 (in lieu of storing in system memory 1104 and/or mass storage device 1106) configured to practice all or selected ones of the operations earlier described with reference to FIGS. 2-9. For one embodiment, at least one of processors 1102 may be packaged together with a computer-readable storage medium having some or all of computing logic 1122 to form a System in Package (SiP). For one embodiment, at least one of processors 1102 may be integrated on the same die with a computer-readable storage medium having some or all of computing logic 1122. For one embodiment, at least one of processors 1102 may be packaged together with a computer-readable storage medium having some or all of computing logic 1122 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 is an apparatus, comprising a cache controller (CC), and a last level cache (LLC) coupled to the CC, the CC to reserve a defined portion of the LLC where data objects whose home location is in a NVM are given placement priority.

Example 2 is the apparatus of example 1, or any other example herein, wherein the CC further monitors activity of the LLC, and determines a size of the defined portion, based, at least in part, on the activity.

Example 3 is the apparatus of example 1, or any other example herein, wherein the CC further designates the defined portion of the LLC for exclusive storage of cache lines for data whose home location is in the NVM.

Example 4 is the apparatus of example 3, or any other example herein, wherein the CC causes read traffic into the NVM to bypass the LLC.

Example 5 is the apparatus of example 1, or any other example herein, wherein the CC is a first CC, wherein the LLC is a first LLC, wherein the first CC further receives, from a second CC coupled to at least one second lower level cache, second modified data objects stored in the second LLC whose home location is in the NVM.

Example 6 is the apparatus of example 5, or any other example herein, wherein the first CC further stores the second modified data objects in the defined portion of the first LLC.

Example 7 is the apparatus of example 6, or any other example herein, wherein the first CC further causes the second modified data objects to be marked for priority transfer back to the NVM before data objects in the LLC that are not marked.

Example 8 is the apparatus of example 7, or any other example herein, further comprising a first memory controller (MC), wherein the first CC further causes the first MC to write the second modified data objects, together with other modified data objects whose home location is in the same block of the first NVM as the second modified data objects, from the first LLC to the first NVM in a block size transfer.

Example 9 is the apparatus of example 1, or any other example herein, wherein the LLC is a first LLC, and the NVM is a first NVM, wherein the CC is further coupled to:

at least one lower level cache and a second LLC, and wherein the CC further: identifies modified data objects in the at least one lower level cache whose home location is in a second NVM; and in response to the identification, causes the modified data objects to be written from the lower level cache to the second LLC, the second LLC located in a same socket as the second NVM.

Example 10 is the apparatus of example 9, or any other example herein, wherein the CC is coupled to the second LLC via a second CC coupled to the second LLC.

Example 11 is the apparatus of example 9, or any other example herein, wherein the modified data objects are written to a defined portion of the second LLC where data objects whose home location is in the second NVM are given placement priority.

Example 12 is the apparatus of example 11, or any other example herein, wherein the defined portion of the second LLC is reserved by a second CC coupled to the second LLC.

Example 13 is one or more non-transitory computer-readable storage media comprising a set of instructions, which, when executed by a CC coupled to a LLC of a computing device, cause the CC to: reserve a defined portion of the LLC where data objects whose home location is in a NVM are given placement priority.

Example 14 is the one or more non-transitory computer-readable storage media of example 13, further comprising instructions that in response to being executed cause the CC to monitor activity of the LLC, and determine a size of the defined portion, based, at least in part, on the activity.

Example 15 is the one or more non-transitory computer-readable storage media of example 13, or any other example herein, further comprising instructions that in response to being executed cause the CC to designate the defined portion of the LLC for exclusive storage of cache lines for data whose home location is the NVM.

Example 16 is the one or more non-transitory computer-readable storage media of example 13, or any other example herein, wherein the defined portion of the LLC is non-exclusive to cache lines for data whose home location is the NVM, and further comprising instructions that in response to being executed cause the CC to cause read traffic into the NVM to bypass the LLC.

Example 17 is the one or more non-transitory computer-readable storage media of example 13, or any other example herein, wherein the CC is a first CC, wherein the LLC is a first LLC, and further comprising instructions that in response to being executed cause the first CC to receive, from a second CC coupled to a second LLC, second modified data objects stored in the second LLC whose home location is in the NVM.

Example 18 is a system, comprising: a NVM; and an apparatus, the apparatus comprising a CC, and a LLC coupled to the CC and associated with the NVM, wherein the CC is to reserve a defined portion of the LLC to provide priority placement for data objects with home location in the NVM.

Example 19 is the system of example 18, or any other example herein, wherein the CC is a first CC, wherein the LLC is a first LLC, wherein the first CC further receives, from a second CC coupled to at least one second lower level cache, second modified data objects stored in the second LLC whose home location is in the NVM.

Example 20 is the system of claim 18, or any other example herein, wherein the LLC is a first LLC, wherein the NVM is a first NVM, and further comprising a second NVM, wherein the CC is further coupled to: at least one lower level cache and a second LLC, and wherein the CC further: identifies modified data objects in the at least one lower level cache whose home location is in the second NVM; and in response to the identification, causes the modified data objects to be written from the lower level cache to the second LLC, the second LLC located in a same socket as the second NVM.

Example 21 is a method, comprising: reserving, by a cache controller coupled to a last level cache (LLC) of a computing device, a defined portion of the LLC where data objects whose home location is in a NVM are given placement priority.

Example 22 is the method of example 21, or any other example herein, further comprising monitoring activity of the LLC, and determining a size of the defined portion, based, at least in part, on the activity.

Example 23 is the method of example 21, or any other example herein, further comprising designating the defined portion of the LLC for exclusive storage of cache lines for the NVM.

Example 24 is the method of example 23, or any other example herein, wherein the CC is a first CC, wherein the LLC is a first LLC, and further comprising receiving, from a second CC coupled to at least one second lower level cache, modified data objects stored in the second lower level cache whose home location is in the NVM.

Example 25 is the method of example 24, or any other example herein, further comprising marking the modified data objects for transfer back to the NVM prior to data objects in the first LLC that are not marked.

Example 25 is the method of example 24, or any other example herein, further comprising causing the modified data objects, together with other modified data objects whose home location is in the same block of the NVM as the modified data objects, to be written from the first LLC to the NVM in a block size transfer.

Example 26 is the method of example 24, or any other example herein, wherein the NVM is a first NVM, and further comprising: identifying modified data objects in at least one lower level cache coupled to the first CC whose home location is in a second NVM; and in response to the identification, causing the modified data objects to be written from the lower level cache to the second LLC, the second LLC located in a same socket as the second NVM.

Example 27 is the method of example 21, or any other example herein, wherein the modified data objects are written to a defined portion of the second LLC where data objects whose home location is in the second NVM are given placement priority.

Example 28 is the method of example 27, or any other example herein, further comprising designating the defined portion of the LLC for exclusive storage of cache lines for the NVM.

Example 29 is an apparatus for computing, comprising: means for reserving a defined portion of an LLC where data objects whose home location is in a NVM are given placement priority.

Example 30 is the apparatus for computing of example 29, or any other example herein, further comprising means for monitoring activity of the LLC, and means for determining a size of the defined portion, based, at least in part, on the activity.

Example 31 is the apparatus for computing of example 29, or any other example herein, further comprising means for designating the defined portion of the LLC for exclusive storage of cache lines for the NVM.

Example 32 is the apparatus for computing of example 29, or any other example herein, further comprising means for receiving modified data objects stored in a lower level cache whose home location is in the NVM.

Example 33 is the apparatus for computing of example 32, or any other example herein, further comprising means for marking the modified data objects for transfer back to the NVM prior to data objects in the LLC that are not marked.

Example 34 is the apparatus for computing of example 32, or any other example herein, further comprising means for causing the modified data objects, together with other modified data objects whose home location is in the same block of the NVM as the modified data objects, to be written from the LLC to the NVM in a block size transfer.

Example 35 is the apparatus for computing of example 29, or any other example herein, wherein the NVM is a first NVM, and the LLC a first LLC, and further comprising: means for identifying modified data objects in at least one lower level cache whose home location is in a second NVM; and means for causing the modified data objects to be written from the lower level cache to a second LLC, in response to the identification, the second LLC located in a same socket as the second NVM.

What is claimed is:

1. An apparatus, comprising:
   a cache controller (CC), and
   a last level cache (LLC) coupled to the CC, wherein the CC is to
      reserve a defined portion of the LLC, to provide priority placement for data objects with home location in a non-volatile memory (NVM) associated with the LLC.

2. The apparatus of claim 1, wherein the CC further monitors activity of the LLC, and determines a size of the defined portion, based, at least in part, on the activity.

3. The apparatus of claim 1, wherein the CC further designates the defined portion of the LLC for exclusive storage of cache lines for data whose home location is in the NVM.

4. The apparatus of claim 3, wherein the CC causes read traffic into the NVM to bypass the LLC.

5. The apparatus of claim 1, wherein the CC is a first CC, wherein the LLC is a first LLC, wherein the first CC further receives, from a second CC coupled to at least one second lower level cache, second modified data objects stored in the second LLC whose home location is in the NVM.

6. The apparatus of claim 5, wherein the first CC further stores the second modified data objects in the defined portion of the first LLC.

7. The apparatus of claim 6, wherein the first CC further causes the second modified data objects to be marked for priority transfer back to the NVM before data objects in the LLC that are not marked.

8. The apparatus of claim 7, further comprising a memory controller (MC), wherein the first CC further causes the MC to write the second modified data objects, together with other modified data objects whose home location is in the same block of the NVM as the second modified data objects, from the first LLC to the NVM in a block size transfer.

9. The apparatus of claim 1, wherein the LLC is a first LLC, wherein the NVM is a first NVM, wherein the CC is further coupled to: at least one lower level cache and a second LLC, and wherein the CC further:
   identifies modified data objects in the at least one lower level cache whose home location is in a second NVM; and
   in response to the identification, causes the modified data objects to be written from the lower level cache to the second LLC, the second LLC located in a same socket as the second NVM.

10. The apparatus of claim 9, wherein the CC is a first CC coupled to the second LLC via a second CC coupled to the second LLC.

11. The apparatus of claim 9, wherein the modified data objects are written to a defined portion of the second LLC where data objects whose home location is in the second NVM are given placement priority.

12. The apparatus of claim 11, wherein the defined portion of the second LLC is reserved by a second CC coupled to the second LLC.

13. One or more non-transitory computer-readable storage media comprising a set of instructions, which, when executed by a CC coupled to an LLC of a computing device, cause the CC to:
   reserve a defined portion of the LLC where data objects whose home location is in a NVM are given placement priority.

14. The one or more non-transitory computer-readable storage media of claim 13, further comprising instructions that in response to being executed cause the CC to monitor activity of the LLC, and determine a size of the defined portion, based, at least in part, on the activity.

15. The one or more non-transitory computer-readable storage media of claim 13, further comprising instructions that in response to being executed cause the CC to designate the defined portion of the LLC for exclusive storage of cache lines for data whose home location is the NVM.

16. The one or more non-transitory computer-readable storage media of claim 13, wherein the defined portion of the LLC is non-exclusive to cache lines for data whose home location is the NVM, and further comprising instructions that in response to being executed cause the CC to cause read traffic into the NVM to bypass the LLC.

17. The one or more non-transitory computer-readable storage media of claim 13, wherein the CC is a first CC, wherein the LLC is a first LLC, and further comprising instructions that in response to being executed cause the first CC to receive, from a second CC coupled to a second LLC, second modified data objects stored in the second LLC whose home location is in the NVM.

18. A system, comprising:
   a NVM; and
   an apparatus, the apparatus comprising:
      a CC, and
      an LLC coupled to the CC and associated with the NVM,
      wherein the CC is to reserve a defined portion of the LLC to provide priority placement for data objects with home location in the NVM.

19. The system of claim 18, wherein the CC is a first CC, wherein the LLC is a first LLC, wherein the first CC further receives, from a second CC coupled to at least one second lower level cache, second modified data objects stored in the second LLC whose home location is in the NVM.

20. The system of claim 18,
   wherein the LLC is a first LLC, wherein the NVM is a first NVM,
   and further comprising a second NVM,
   wherein the CC is further coupled to: at least one lower level cache and a second LLC, and
   wherein the CC further:

identifies modified data objects in the at least one lower level cache whose home location is in the second NVM; and in response to the identification, causes the modified data objects to be written from the lower level cache to the second LLC, the second LLC located in a same socket as the second NVM.

\* \* \* \* \*